United States Patent
Rohera

(10) Patent No.: US 11,117,476 B2
(45) Date of Patent: Sep. 14, 2021

(54) POWER GENERATING SYSTEM AND METHOD FOR A VEHICLE

(71) Applicant: Hemant Karamchand Rohera, Maharashtra (IN)

(72) Inventor: Hemant Karamchand Rohera, Maharashtra (IN)

(73) Assignee: Hemant Karamchand Rohera, Pune (IN)

( * ) Notice: Subject to any disclaimer, the term of this patent is extended or adjusted under 35 U.S.C. 154(b) by 288 days.

(21) Appl. No.: 15/762,398

(22) PCT Filed: Sep. 17, 2016

(86) PCT No.: PCT/IB2016/055563
§ 371 (c)(1),
(2) Date: Mar. 22, 2018

(87) PCT Pub. No.: WO2017/051299
PCT Pub. Date: Mar. 30, 2017

(65) Prior Publication Data
US 2018/0272873 A1    Sep. 27, 2018

(30) Foreign Application Priority Data
Sep. 25, 2015 (IN) .......................... 3649/MUM/2015

(51) Int. Cl.
*H02J 7/00*     (2006.01)
*H02J 3/38*     (2006.01)
(Continued)

(52) U.S. Cl.
CPC ............... *B60L 50/50* (2019.02); *B60L 8/003* (2013.01); *B60L 8/006* (2013.01); *B60L 50/75* (2019.02); *B60L 50/90* (2019.02); *B60L 58/10* (2019.02); *B60L 58/40* (2019.02); *H02J 3/381* (2013.01); *H02J 7/0063* (2013.01); *H02J 7/0068* (2013.01); *B60L 2210/30* (2013.01);
(Continued)

(58) Field of Classification Search
CPC ........ B60L 11/002; B60L 50/50; B60L 50/90; B60L 58/10; B60L 58/40; B60L 8/003; B60L 8/006; B60L 2210/30; B60L 2210/40; H02J 3/381; H02J 7/0063; H02J 7/0068; Y02T 10/7083; Y02T 90/34
See application file for complete search history.

(56) References Cited

U.S. PATENT DOCUMENTS

2004/0062059 A1* 4/2004 Cheng ..................... B60L 53/22
    363/17
2012/0008357 A1* 1/2012 Azuma .................... H01G 4/38
    363/131

FOREIGN PATENT DOCUMENTS

IN    01284CHE2014    5/2015

OTHER PUBLICATIONS

International Search Report in corresponding International Application No. PCT/IB2016/055563 dated Dec. 15, 2016.

* cited by examiner

*Primary Examiner* — Rexford N Barnie
*Assistant Examiner* — Elim Ortiz
(74) *Attorney, Agent, or Firm* — Andrus Intellectual Property Law, LLP

(57) ABSTRACT

The present disclosure relates to the field of power electronics and provides a power generating system and method for a vehicle. The present disclosure provides an alternative system for charging an energy storage device that is used to drive a vehicle and also to reduce dependency of the vehicle on the energy storage device.

11 Claims, 3 Drawing Sheets

(51) Int. Cl.
*B60L 50/50* (2019.01)
*B60L 8/00* (2006.01)
*B60L 58/10* (2019.01)
*B60L 58/40* (2019.01)
*B60L 50/90* (2019.01)
*B60L 50/75* (2019.01)

(52) U.S. Cl.
CPC ........ *B60L 2210/40* (2013.01); *Y02T 10/7072* (2013.01); *Y02T 90/40* (2013.01)

COMPLETE SPECIFICATION

COMPLETE SPECIFICATION

POWER GENERATING SYSTEM AND METHOD FOR A VEHICLE

CROSS-REFERENCE TO RELATED APPLICATIONS

This application is the U.S. national stage application of International Application PCT/IB2016/055563, filed Sep. 17, 2016, which international application was published on Mar. 30, 2017, as International Publication WO2017/051299 in the English language. The international application is incorporated herein by reference, in entirety. The international application claims priority to Indian Patent Application No. 3649/MUM/2015, filed Sep. 25, 2015, which is incorporated herein by reference, in entirety.

FIELD

The present disclosure relates to the field of power electronics.

Definitions

As used in the present disclosure, the following terms are generally intended to have the meaning as set forth below, except to the extent that the context in which they are used indicate otherwise.

The expression 'energy storage device' used hereinafter in the specification refers to but is not limited to a charge storage component such as battery cells, and capacitors.

The expression 'ultra-capacitor' used hereinafter in the specification refers to but is not limited to a high-capacity electrochemical capacitor with capacitance values greater than 1,000 Farads.

The expression 'SOC' (State of Charge) used hereinafter in the specification refers to but is not limited to the percentage of maximum possible charge/energy that is present inside an energy storage device.

The expression 'electric vehicle' or 'hybrid vehicle' or 'vehicle' used hereinafter in the specification refers to a passenger car, a battery operated car, road going means of transportation, a heavy goods vehicle (HGV), a bus, a two wheeler, a bicycle with electric motor, an electric scooter, an electric motorcycle, a tricycle, an electric wheelchair, a military vehicle, a train, a tram, a mining vehicle and the like.

The expression 'DC to DC converter' used hereinafter in the specification refers to an electric power converter that converts one DC voltage and/or current level to another DC voltage and/or current level.

The expression 'AC to AC converter' used hereinafter in the specification refers to an electric power converter that converts one AC voltage and/or current level to another AC voltage and/or current level.

The expression 'DC to AC converter' used hereinafter in the specification refers to an electric power converter that converts a DC signal into an AC signal.

The expression 'AC to DC converter' used hereinafter in the specification refers to an electric power converter that converts an AC signal into a DC signal.

The expression 'booster' used hereinafter in the specification refers to an electronic device that amplifies an AC signal or a DC signal.

These definitions are in addition to those expressed in the art.

BACKGROUND

Conventionally, in an electric/hybrid vehicle system, an energy storage device is used to transmit power to a motor that drives the vehicle. Power is also drawn from an energy storage device to run electrical components of the vehicle. Since, there is no alternative power source to provide power to electric vehicles the energy storage device gets continuously discharged and therefore, continuous charging of the energy storage device is required. Further, continuous charging and discharging of the energy storage device causes decline in longevity of the life of the energy storage device. Charging an energy storage device continuously is also a challenge since the availability of charging stations for charging energy storage devices is limited.

Hence there is a need for developing an alternative system for charging an energy storage device that is used to drive a vehicle and also to reduce dependency of the vehicle on the energy storage device.

OBJECTS

Some of the objects of the present disclosure, which at least one embodiment herein satisfies, are as follows:

It is an object of the present disclosure to ameliorate one or more problems of the prior art or to at least provide a useful alternative.

An object of the present disclosure is to provide a power generating system for a vehicle, that improves the life of an energy storage device of the vehicle.

Still another object of the present disclosure is to provide a power generating system for a vehicle, that avoids deep discharging of an energy storage device of the vehicle.

Another object of the present disclosure is to provide a power generating system for a vehicle, that needs less maintenance and is cost-effective.

Still another object of the present disclosure is to provide a power generating system for a vehicle, that is safe and secure.

Other objects and advantages of the present disclosure will be more apparent from the following description, which is not intended to limit the scope of the present disclosure.

SUMMARY

The present disclosure envisages a power generating system for a vehicle. The system includes at least one first generator, a power processing unit and an at least one energy storage device. In accordance with an embodiment of the present disclosure, the at least one first generator produces an AC electric power. The power processing unit cooperates with the at least one first generator to receive the AC electric power. The power processing unit generates a sustained DC electric power from the AC electric power, receives a DC electric power from the at least one energy storage device connected to the power processing unit, and generates a sustained AC electric power based on at least one of the AC electric power and the DC electric power. Further, the power processing unit simultaneously provides the sustained DC electric power to the at least one energy storage device, and the sustained AC electric power to a motor of the vehicle connected to the power processing unit.

In accordance with an embodiment of the present disclosure, the at least one first generator produces a generated DC electric power. The power processing unit cooperates with the at least one first generator. The power processing unit receives the generated DC electric power, generates a sustained DC electric power from the generated DC electric power, receives a DC electric power from the at least one energy storage device connected to the power processing unit, and generates a sustained AC electric power based on at least one of the generated DC electric power and the DC electric power. Further, the power processing unit simultaneously provides the sustained DC electric power to the at least one energy storage device, and the sustained AC electric power to a motor of the vehicle connected to the power processing unit.

In accordance with another embodiment, the at least one first generator is selected from the group consisting of a solar panel sub-system, a regenerative braking sub-system, a thin air ion-capturing sub-system, a glass window pane sub-system, a wind-turbine driven sub-system, a heat and sound sub-system, a DC generator, and an AC generator.

In accordance with yet another embodiment, the power processing unit comprises at least one DC to AC converter, at least one AC to DC converter, at least one booster, at least one DC to DC converter, at least one AC to AC converter, at least one regulator, and a processor.

In accordance with one embodiment of the present disclosure, the motor is selected from the group consisting of an AC and brushless motor, an induction motor, a permanent magnet motor, and a switched reluctance motor.

In accordance with an embodiment, the at least one energy storage device is selected from the group consisting of a capacitor bank, a flow battery, a vanadium redox battery, a zinc bromide battery, a fuel cell, a lead acidic battery, a VRLA battery, a lithium ion battery, a AGM battery, a gel battery, a lithium ion polymer battery, a molten salt battery, a nickel cadmium battery, a sodium ion battery, a super iron battery, a silver zinc battery, a zinc chloride battery, a graphene battery, a sodium metal halide battery, a silicon battery, a hybrid battery, and a zinc carbon battery.

In accordance with another embodiment, the AC generator is fitted to at least one of a front wheel of the vehicle, suspension of the vehicle, and a drive wheel of the vehicle.

In accordance with yet another embodiment, the solar panel sub-system, the regenerative braking sub-system, the thin air ion-capturing sub-system, the glass window pane sub-system, the wind-turbine driven sub-system, the heat and sound sub-system, the DC generator and the AC generator concurrently provide the first electric power to the power processing unit thereby providing the sustained first electric power and the sustained second electric power to the at least one energy storage device and the motor respectively.

In accordance with an embodiment, the heat and sound sub-system includes a piezoelectric material, which converts external mechanical energy of vibration and sound pressure into said first electric power.

The present disclosure also envisages a power generating method for a vehicle.

BRIEF DESCRIPTION OF THE ACCOMPANYING DRAWING

The power generating system and method for a vehicle of the present disclosure will now be described with the help of the accompanying drawing, in which.

LIST OF REFERENCE NUMERALS USED IN DRAWING AND DESCRIPTION

Figure 1:
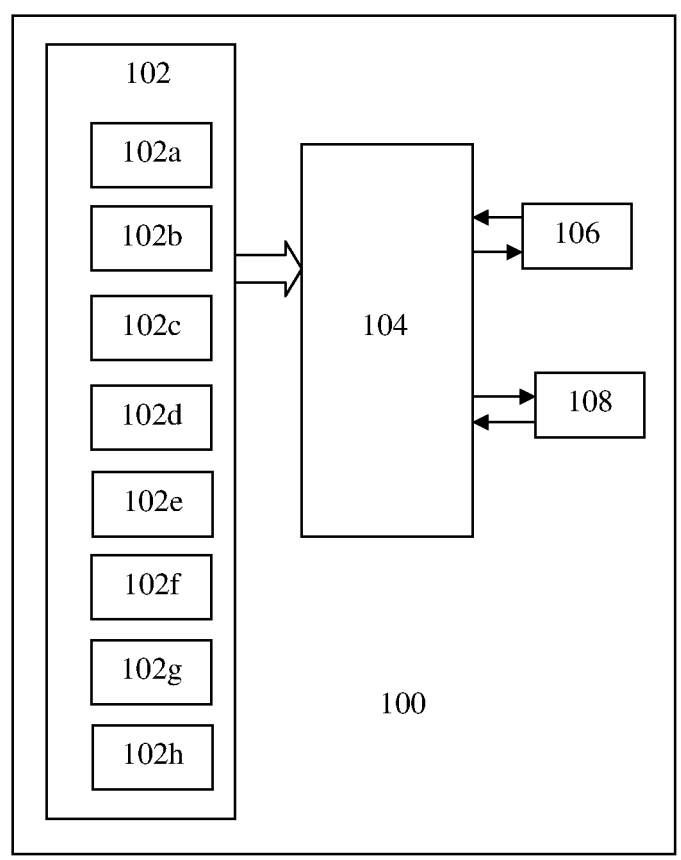
FIG. 1 illustrates a block diagram representing the power generating system for a vehicle, in accordance with an embodiment of the present disclosure.

| Reference Numeral | Reference |
|---|---|
| 100 | power generating system |
| 102 | at least one first generator |
| 102 a | solar panel sub-system |
| 102 b | regenerative braking sub-system |
| 102 c | thin air ion-capturing sub-system |
| 102 d | glass window pane sub-system |
| 102 e | wind-turbine driven sub-system |
| 102 f | heat and the sound sub-system |
| 102 g | DC generator |
| 102 h | AC generator |
| 104 | power processing unit |
| 106 | at least one energy storage device |
| 108 | motor |
| 202 | at least one DC to AC converter |
| 204 | at least one AC to DC converter |
| 206 | booster |
| 208 | at least one DC to DC converter |
| 210 | at least one AC to AC converter |
| 212 | at least one regulator |
| 214 | processor |
| 300 | power generating method |

DETAILED DESCRIPTION

Conventionally, in an electric/hybrid vehicle system, an energy storage device is used to transmit power to a motor that drives the vehicle. Power is also drawn from an energy storage device to run electrical components of the vehicle. Since, there is no alternative power source to provide power to electric vehicles the energy storage device gets continuously discharged and therefore, continuous charging of the energy storage device is required. Further, continuous charging and discharging of the energy storage device causes decline in longevity of the life of the energy storage device. The present disclosure provides power generating system and method for a vehicle. The present disclosure provides an alternative system for charging an energy storage device that is used to drive a vehicle and also to reduce dependency of the vehicle on the energy storage device.

FIG. 1 illustrates a block diagram representing the power generating system for a vehicle, in accordance with an embodiment of the present disclosure. The power generating system 100 includes at least one first generator 102, a power processing unit 104, and an at least one energy storage device 106. The least one first generator 102 produces a first electric power. The first electric power may be an AC power or a DC power. The first electric power is generally an alternative power generated by the at least one first generator 102. The at least one first generator 102 includes a power generating sub-system or power generating sub-systems or a combination of power generating sub-systems. The power generating sub-systems include a solar panel sub-system 102a, a regenerative braking sub-system 102b, a thin air ion-capturing sub-system 102c, a glass window pane sub-system 102d, a wind-turbine driven sub-system 102e, a heat and the sound sub-system 102f, a DC generator 102g and an AC generator 102h.

The at least one energy storage device 106 is connected to the power processing unit 104. The at least one energy storage device 106 is selected from the group consisting of a capacitor bank, a flow battery, a vanadium redox battery, a zinc bromide battery, a fuel cell, a lead acidic battery, a VRLA battery, a lithium ion battery, a AGM battery, a gel battery, a lithium ion polymer battery, a molten salt battery, a nickel cadmium battery, a sodium ion battery, a super iron battery, a silver zinc battery, a zinc chloride battery, a graphene battery, a sodium metal halide battery, a silicon battery, a hybrid battery, and a zinc carbon battery. The capacitor bank may include ultra-capacitors or super-capacitors.

In an embodiment, a motor 108 of the vehicle is an AC motor. The motor 108 is selected from the group consisting of an AC and brushless motor, an induction motor, a permanent magnet motor, and a switched reluctance motor.

Figure 2:
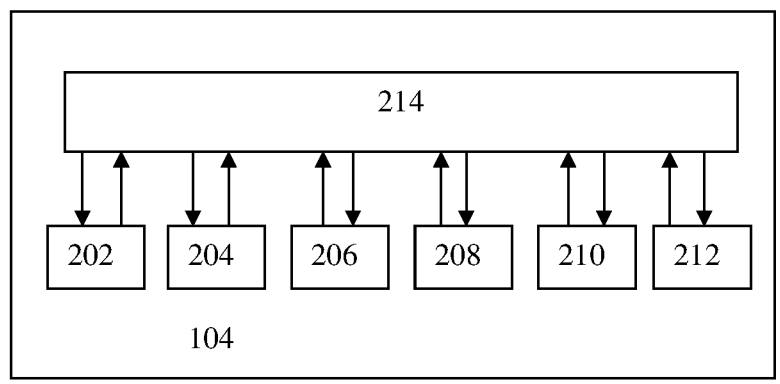
FIG. 2 illustrates a block diagram of a power processing unit in accordance with one embodiment of the present disclosure, for the power generating system of FIG. 1.

FIG. 2 illustrates a block diagram of a power processing unit 104 in accordance with one embodiment of the present disclosure, for the power generating system of FIG. 1. The power processing unit 104 is typically a mixed signal processing application specific integrated circuit. In an embodiment, the power processing unit 104 is a power electronic converter. The power processing unit 104 includes at least one DC to AC converter 202, at least one AC to DC converter 204, at least one booster 206, at least one DC to DC converter 208, at least one AC to AC converter 210, at least one regulator 212 and a processor 214. The power processing unit 104 receives the first electric power from the at least one first generator 102. The processor 214 is a mixed signal (analog and digital) processor. The processor 214 analyzes the first electric power.

In an embodiment, the at least one booster 206 is an AC booster and a DC booster.

In another embodiment, the first electric power is an AC power. The processor 214 detects an AC current component and an AC voltage component of the AC power. The processor 214, further computes amplitude of the AC current component and the AC voltage component (normal AC components). If the amplitude of the AC voltage component is less than a predetermined AC voltage threshold value, stored in a memory (not shown in figures) of the processor 214, then the processor 214 transmits the AC voltage component to the booster 206. The booster 206 boosts the AC voltage component and generates the boosted AC voltage component. The processor 214 receives the boosted AC voltage component. The processor 214 performs similar operation for the AC current component using a predetermined AC current threshold value, stored in the memory (not shown in figures) of the processor 214, and the booster 206 generates a boosted AC current component. The boosted AC voltage component and boosted AC current component are referred to as boosted AC components. The processor 214 reads a state of charge (SOC) of the at least one energy storage device 106. If the SOC of the at least one energy storage device 106 is less than a predetermined SOC value, stored in the memory (not shown in figures) of the processor 214, then the processor 214 generates a sustained second electric power (sustained AC electric power) using the boosted AC components or normal AC components or their combination. The processor 214 transmits the sustained second electric power to the motor 108. By providing the sustained second electric power (sustained AC electric power) to the motor 108, continuous discharging of the at least one energy storage device 106 is eliminated which increases longevity of the life of the at least one energy storage device 106, and also reduces dependency of the vehicle on the at least one energy storage device 106. Concurrently, the processor 214 also generates a sustained first electric power (sustained DC electric power) with the help of the AC to DC converter 204 and by using the boosted AC components or normal AC components or their combination, and transmits the sustained first electric power to the at least one energy storage device 106. If the SOC of the at least one energy storage device 106 is greater than or equal to the predetermined SOC value, then the processor 214 generates a sustained second electric power with the help of the DC to AC converter 202 and by using a second electric power produced by the at least one energy storage device 106.

In yet another embodiment, the first electric power is a DC power. The processor 214 detects a DC current component and a DC voltage component of the DC power. The processor 214, further computes amplitude of the DC current component and the DC voltage component (normal DC components). If the amplitude of the DC voltage component is less than a predetermined DC voltage threshold value, stored in a memory (not shown in figures) of the processor 214, then the processor 214 transmits the DC voltage component to the booster 206. The booster 206 boosts the DC voltage component and generates the boosted DC voltage component. The processor 214 receives the boosted DC voltage component. The processor 214 performs similar operation for the DC current component using a predetermined DC current threshold value, stored in the memory (not shown in figures) of the processor 214, and the booster 206 generates a boosted DC current component. The boosted DC voltage component and boosted DC current component are referred to as boosted DC components. The processor 214 reads a state of charge (SOC) of the at least one energy storage device 106. If the SOC of the at least one energy storage device 106 is less than a predetermined SOC value, stored in the memory (not shown in figures) of the processor 214, then the processor 214 generates a sustained first electric power with the help of the regulator 212 and using the boosted DC components or normal DC components or their combination. The processor 214 transmits the sustained first electric power to the at least one energy storage device 106. Concurrently, the processor 214 also generates a sustained second electric power with the help of the DC to AC converter 204 and using the boosted DC components or normal DC components or their combination, and transmits the sustained second electric power to the motor 108. By providing the sustained second electric power to the motor 108 continuous discharging of the at least one energy storage device 106 is eliminated which increases longevity of the life of the at least one energy storage device 106 and also reduces dependency of the vehicle on the at least one energy storage device 106 for driving. If the SOC of the at least one energy storage device 106 is greater than or equal to the predetermined SOC value, then the processor 214 generates a sustained second electric power with the help of the DC to AC converter 202 and by using a second electric power produced by the at least one energy storage device 106. In still another embodiment, If the SOC of the at least one energy storage device 106 is greater than or equal to the predetermined SOC value, then the processor 214 generates a sustained second electric power with the help of the DC to AC converter 202 and by using the combination of the boosted DC components, or the normal DC components and a second electric power produced by the at least one energy storage device 106.

In accordance with an embodiment of the present disclosure, the solar panel sub-system 102a, the regenerative braking sub-system 102b, the thin air ion-capturing sub-system 102c, the glass window pane sub-system 102d, the wind-turbine driven sub-system 102e, the heat and sound sub-system 102f, the DC generator 102g, and the AC generator 102h concurrently provide a first electric power to the power processing unit 104 thereby providing a sustained first electric power and a sustained second electric power to at least one energy storage device 106 and the motor 108 respectively. All the above mentioned sub-systems are disposed in the vehicle. Any permutation or combination of the above mentioned sub-systems can be used for generating the first electric power.

In accordance with another embodiment of the present disclosure, the solar panel sub-system 102a includes at least one solar panel (not shown in the figures). The solar power is drawn from the at least one solar panel mounted on any part of the vehicle. The at least one solar panel generates a DC power. The generated DC power is the first electric power or a part of the first electric power. The power processing unit 104 receives the generated DC power, provides a sustained first electric power and a sustained second electric power to the at least one energy storage device 106 and the motor 108 respectively, thereby providing drive to the vehicle.

In accordance with yet another embodiment of the present disclosure, the wind-turbine driven sub-system 102e includes at least two wind turbines (not shown in figures). The at least two wind turbines are provided on the sides or at the top of the vehicle. The at least two wind-turbines are configured to be driven by the wind, generated during the movement of the vehicle, thereby generating AC power. The generated AC power is the first electric power or a part of the first electric power. The power processing unit 104 receives the generated AC power, provides a sustained first electric power and a sustained second electric power to the at least one energy storage device 106 and the motor 108 respectively, thereby providing drive to the vehicle.

In accordance with an embodiment of the present disclosure, the regenerative braking sub-system 102b employs a control unit (not shown in figures). The regenerative braking sub-system 102b is mounted on the vehicle. The control unit allows the motor 108 of the vehicle to work as a generator during braking to absorb the vehicle's kinetic energy. This kinetic energy is converted into a DC power. The converted DC power is the first electric power or a part of the first electric power. The power processing unit 104 receives the converted DC power, provides a sustained first electric power and a sustained second electric power to the at least one energy storage device 106 and the motor 108 respectively, thereby providing drive to the vehicle.

Further, in accordance with one embodiment of the present disclosure, the thin air ion-capturing sub-system 102c employs a control device (not shown in figures) that receives wireless signals and RF signals, and generates an AC power from the received wireless signals, and RF signals. The thin air ion-capturing sub-system 102c is mounted on any part of the vehicle. The generated AC power is the first electric power or a part of the first electric power. The power processing unit 104 receives the generated AC power, provides a sustained first electric power and a sustained second electric power to the at least one energy storage device 106 and the motor 108 respectively, thereby providing drive to the vehicle.

Furthermore, in accordance with an embodiment of the present disclosure, the glass window pane sub-system 102d includes at least one sensing device (not shown in figures) configured to sense the oscillations of at least one glass in at least one glass window pane during the movement of the vehicle, and therefore generates an oscillatory power. The power processing unit 104 receives the generated oscillatory power, provides a sustained first electric power and a sustained second electric power to the at least one energy storage device 106 and the motor 108 respectively, thereby providing drive to the vehicle.

In accordance with another embodiment of the present disclosure, the heat and sound sub-system 102f includes a heat sensing device and a sound sensing device. The sound sensing device includes a piezoelectric material, which converts external mechanical energy of vibration and sound pressure into a first electric power or a part of the first electric power. In another embodiment, the sound sensing device includes energy conversion fiber bodies. The heat sensing device includes a thermionic generator that turns heat or light into a first electrical power or a part of the first electric power.

In accordance with an embodiment of the present disclosure, the AC generator 102h is fitted to at least one of a front wheel of the vehicle, suspension of the vehicle, and the drive wheel of the vehicle. The AC generator 102h is configured to generate an AC power from at least one of the following:
motion of the front wheel (or any other wheel) of the vehicle,
movement of the suspension of the vehicle (vertical acceleration movements of a vehicle body), and
movement of the drive wheel of a vehicle.

In accordance with further embodiment of the present disclosure, the DC generator 102g is fitted to the front wheel(s) of the vehicle. The DC generator 102g is configured to generate a DC power.

Figure 3:
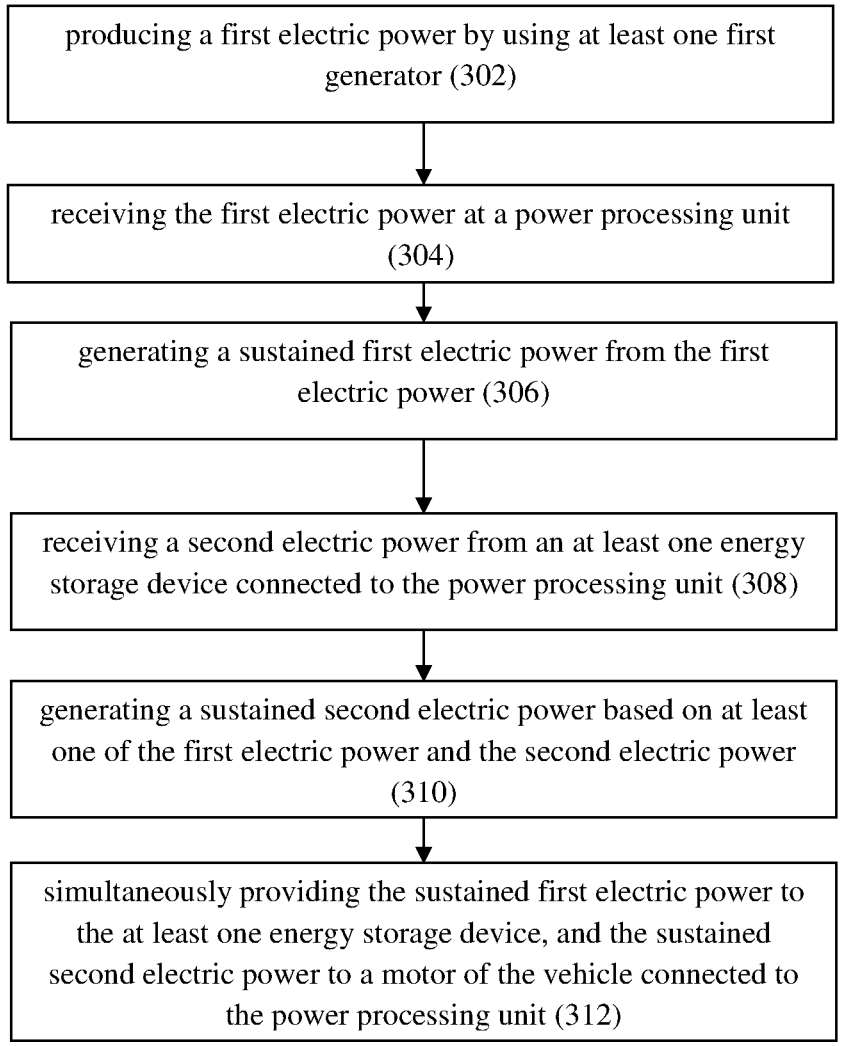
FIG. 3 illustrates a power generating method for a vehicle.

The present disclosure also envisages a power generating method for a vehicle. The method 300 may be described in general context of computer executable instructions. The method 300 may be implemented in any suitable hardware, software, firmware, or any combination thereof. FIG. 3 of the accompanying drawing illustrates a power generating method for a vehicle.

At block 302, the method 300 includes producing a first electric power by using at least one first generator.

At block 304, the method 300 includes receiving the first electric power at a power processing unit.

At block 306, the method 300 includes generating a sustained first electric power from the first electric power.

At block 308, the method 300 includes receiving a second electric power from an at least one energy storage device connected to the power processing unit.

At block 310, the method 300 includes generating a sustained second electric power based on at least one of the first electric power and second electric power.

At block 312, the method 300 includes simultaneously providing the sustained first electric power to the at least one energy storage device, and the sustained second electric power to a motor of the vehicle connected to the power processing unit.

TECHNICAL ADVANCEMENTS

The power generating system for a vehicle in accordance with the present disclosure has several technical advantages including but not limited to the realization of a system that:
improves life of an at least one energy storage device of the vehicle;
avoids deep discharging of an at least one energy storage device of the vehicle;
needs less maintenance and is cost-effective; and
is safe and secure.

The foregoing disclosure has been described with reference to the accompanying embodiments which do not limit the scope and ambit of the disclosure. The description provided is purely by way of example and illustration.

The embodiments herein and the various features and advantageous details thereof are explained with reference to the non-limiting embodiments in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The foregoing description of the specific embodiments so fully revealed the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, elements, devices, articles or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, dimensions or quantities fall within the scope of the disclosure, unless there is a statement in the specification specific to the contrary.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A power generating system for a vehicle comprising:
   at least one first generator configured to produce a first electric power; and
   a power processing unit comprising at least one DC to AC converter, at least one AC to DC converter, at least one booster, at least one DC to DC converter, at least one AC to AC converter, at least one regulator, and a processor, said power processing unit adapted to cooperate with said at least one first generator, said power processing unit configured to:
   receive said first electric power,
   generate a sustained first electric power from said first electric power,
   receive a second electric power from an at least one energy storage device connected to said power processing unit,
   read a state of charge (SOC) of said at least one energy storage device,
   generate a sustained second electric power:
      from said first electric power if the SOC of said energy storage device is less than a predetermined SOC value;
      from said second electric power or a combination of said first electric power and said second electric power if the SOC of said energy storage device is greater than or equal to said predetermined SOC value, and
      simultaneously provide said sustained first electric power to said at least one energy storage device, and said sustained second electric power to a motor of said vehicle connected to said power processing unit;
   wherein said first electric power is an AC power or a DC power and said second electric power is a DC power.

2. The system as claimed in claim 1, wherein said sustained first electric power is a sustained DC power, and said sustained second electric power is a sustained AC power.

3. The system as claimed in claim 1, wherein said at least one first generator is selected from the group consisting of a solar panel sub-system, a regenerative braking sub-system, a thin air ion-capturing sub-system, a glass window pane sub-system, a wind-turbine driven sub-system, a heat and sound sub-system, a DC generator, and an AC generator.

4. The system as claimed in claim 1, wherein said motor is selected from the group consisting of an AC and brushless motor, an induction motor, a permanent magnet motor, and a switched reluctance motor.

5. The system as claimed in claim 1, wherein said at least one energy storage device is selected from the group consisting of a capacitor bank, a flow battery, a vanadium redox battery, a zinc bromide battery, a fuel cell, a lead acidic battery, a VRLA battery, a lithium ion battery, a AGM battery, a gel battery, a lithium ion polymer battery, a molten salt battery, a nickel cadmium battery, a sodium ion battery, a super iron battery, a silver zinc battery, a zinc chloride battery, a graphene battery, a sodium metal halide battery, a silicon battery, a hybrid battery, and a zinc carbon battery.

6. The system as claimed in claim 3, wherein said AC generator is fitted to at least one of a front wheel of said vehicle, suspension of said vehicle, and a drive wheel of said vehicle.

7. The system as claimed in claim 3, wherein said solar panel sub-system, said regenerative braking sub-system, said thin air ion-capturing sub-system, said glass window pane sub-system, said wind-turbine driven sub-system, said heat and sound sub-system, said DC generator and said AC generator concurrently provide said first electric power to said power processing unit thereby providing said sustained first electric power and said sustained second electric power to said at least one energy storage device and said motor respectively.

8. The system as claimed in claim 3, wherein said heat and sound sub-system includes a piezoelectric material, which converts external mechanical energy of vibration and sound pressure into said first electric power.

9. A power generating method for a vehicle comprising the following:
producing a first electric power by using at least one first generator; and
receiving said first electric power at a power processing unit, wherein said power processing unit comprises at least one DC to AC converter, at least one AC to DC converter, at least one booster, at least one DC to DC converter, at least one AC to AC converter, at least one regulator, and a processor, said power processing unit performing the following:
generating a sustained first electric power from said first electric power,
receiving a second electric power from an at least one energy storage device connected to said power processing unit,
reading a state of charge (SOC) of said at least one energy storage device,
generating a sustained second electric power:
from said first electric power if the SOC of said energy storage device is less than a predetermined SOC value;
from said second electric power or a combination of said first electric power and said second electric power if the SOC of said energy storage device is greater than or equal to said predetermined SOC value, and
simultaneously providing said sustained first electric power to said at least one energy storage device, and said sustained second electric power to a motor of said vehicle connected to said power processing unit,
wherein said first electric power is an AC power or a DC power and said second electric power is a DC power.

10. The power generating method of claim 9, wherein said sustained first electric power is a sustained DC power and said sustained second electric power is a sustained AC power.

11. A power generating system for a vehicle comprising:
a plurality of first generators configured to produce a first electric power; and
a power processing unit adapted to cooperate with said first generators, said power processing unit configured to:
receive said first electric power,
generate a sustained first electric power from said first electric power,
receive a second electric power from an at least one energy storage device connected to said power processing unit,
generate a sustained second electric power based on at least one of said first electric power and said second electric power, and
simultaneously provide said sustained first electric power to said at least one energy storage device, and said sustained second electric power to a motor of said vehicle connected to said power processing unit,
wherein said plurality of first generators comprise of a solar panel sub-system, a regenerative braking sub-system, a thin air ion-capturing sub-system, a glass window pane sub-system, a wind-turbine driven sub-system, a heat and sound sub-system, a DC generator, and an AC generator; and
wherein said solar panel sub-system, said regenerative braking sub-system, said thin air ion-capturing sub-system, said glass window pane sub-system, said wind-turbine driven sub-system, said heat and sound sub-system, said DC generator and said AC generator concurrently provide said first electric power to said power processing unit thereby providing said sustained first electric power and said sustained second electric power to said at least one energy storage device and said motor respectively.

* * * * *